(12) United States Patent
Durbin

(10) Patent No.: US 7,347,375 B2
(45) Date of Patent: *Mar. 25, 2008

(54) READER FOR DECODING TWO-DIMENSIONAL OPTICALLY READABLE INFORMATION

(75) Inventor: Dennis A. Durbin, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,199

(22) Filed: Nov. 4, 2003

(65) Prior Publication Data

US 2004/0089722 A1    May 13, 2004

Related U.S. Application Data

(63) Continuation of application No. 09/961,697, filed on Sep. 24, 2001, now Pat. No. 6,641,046, which is a continuation of application No. 09/170,689, filed on Oct. 13, 1998, now Pat. No. 6,330,975, which is a continuation of application No. 08/703,564, filed on Aug. 27, 1996, now Pat. No. 5,821,523, which is a continuation-in-part of application No. 08/461,605, filed on Jun. 5, 1995, now Pat. No. 5,902,988, which is a continuation of application No. 08/277,132, filed on Jul. 19, 1994, now abandoned, which is a continuation of application No. 07/919,488, filed on Jul. 27, 1992, now abandoned, which is a continuation-in-part of application No. 07/849,771, filed on Mar. 12, 1992, now abandoned, and a continuation-in-part of application No. 07/889,705, filed on May 26, 1992, now abandoned, which is a continuation-in-part of application No. 07/849,771, filed on Mar. 12, 1992, now abandoned.

(51) Int. Cl.
   *G06K 7/10* (2006.01)
(52) U.S. Cl. ............................. 235/462.45; 235/462.2
(58) Field of Classification Search ........... 235/462.01, 235/462.08, 462.09, 462.11, 462.22, 462.45, 235/462.2

See application file for complete search history.

(56) References Cited

U.S. PATENT DOCUMENTS 3,513,320 A    5/1970    Weldon (Continued)

FOREIGN PATENT DOCUMENTS

EP    0349770    1/1990

(Continued)

OTHER PUBLICATIONS

US 5,347,112, Sep. 1994, Durbin (withdrawn).

(Continued)

*Primary Examiner*—Ahshik Kim
(74) *Attorney, Agent, or Firm*—Shook, Hardy & Bacon, L.L.P.

(57) ABSTRACT

An apparatus and method for reading optical information including a photosensitive system oriented to capture optical information. Also included is an optical system focusing optical information onto the photosensitive system, and a display oriented to display optical information captured by the photosensitive system. The apparatus also includes a portable, hand-held housing.

14 Claims, 6 Drawing Sheets

U.S. PATENT DOCUMENTS

| | | | |
|---|---|---|---|
| 4,044,227 | A | 8/1977 | Holm et al. |
| 4,360,798 | A | 11/1982 | Swartz et al. |
| 4,369,361 | A | 1/1983 | Swartz et al. |
| 4,456,931 | A | 6/1984 | Toyoda et al. |
| 4,488,679 | A | 12/1984 | Bockholt et al. |
| 4,538,060 | A | 8/1985 | Sakai et al. |
| 4,541,010 | A | 9/1985 | Alston |
| 4,734,566 | A | 3/1988 | Senda et al. |
| 4,764,668 | A | 8/1988 | Hayard |
| 4,786,792 | A | 11/1988 | Pierce et al. |
| 4,818,856 | A | 4/1989 | Matsushima et al. |
| 4,822,986 | A | 4/1989 | Guthmueller et al. |
| 4,877,949 | A | 10/1989 | Danielson et al. |
| 5,107,100 | A | 4/1992 | Shepard et al. |
| 5,117,098 | A | 5/1992 | Swartz |
| 5,124,539 | A | 6/1992 | Krichever et al. |
| 5,212,371 | A | 5/1993 | Boles et al. |
| 5,235,167 | A * | 8/1993 | Dvorkis et al. ........ 235/462.21 |
| 5,321,523 | A | 6/1994 | Hashimoto |
| 5,331,176 | A * | 7/1994 | Sant' Anselmo et al. ... 250/566 |
| 5,347,113 | A | 9/1994 | Reddersen et al. |
| 5,365,050 | A | 11/1994 | Worthington et al. |
| 5,371,347 | A | 12/1994 | Plesko |
| 5,371,348 | A | 12/1994 | Kumar et al. |
| 5,373,148 | A * | 12/1994 | Dvorkis et al. ........ 235/462.36 |
| 5,378,882 | A | 1/1995 | Gong et al. |
| 5,382,779 | A | 1/1995 | Gupta |
| 5,382,782 | A | 1/1995 | Hasegawa et al. |
| 5,396,054 | A * | 3/1995 | Krichever et al. ....... 235/462.1 |
| 5,406,061 | A | 4/1995 | Knight |
| 5,410,141 | A | 4/1995 | Koenck et al. |
| 5,414,250 | A | 5/1995 | Swartz et al. |
| 5,414,251 | A * | 5/1995 | Durbin .................... 235/462.2 |
| 5,418,684 | A | 5/1995 | Koenck et al. |
| 5,466,921 | A | 11/1995 | Lapinski et al. |
| 5,504,316 | A | 4/1996 | Bridgelall et al. |
| 5,513,264 | A * | 4/1996 | Wang et al. .................. 380/51 |
| 5,659,167 | A * | 8/1997 | Wang et al. ........... 235/472.01 |
| 5,821,523 | A | 10/1998 | Bunte et al. |
| 5,902,988 | A | 5/1999 | Durbin |
| 6,039,258 | A | 3/2000 | Durbin et al. |
| 6,164,545 | A | 12/2000 | Danielson |
| 6,330,975 | B1 | 12/2001 | Bunte et al. |
| 6,332,575 | B1 | 12/2001 | Schuessler et al. |
| 6,641,046 | B2 | 11/2003 | Durbin |

FOREIGN PATENT DOCUMENTS

| | | |
|---|---|---|
| EP | 0385478 | 9/1990 |
| EP | 0631679 | 10/1999 |
| JP | 0120388 | 5/1988 |
| JP | 63-253483 | 10/1988 |
| JP | 0100664 | 4/1989 |
| JP | 0198175 | 8/1991 |
| JP | 5-94556 | 4/1993 |
| JP | 5-174204 | 7/1993 |
| JP | 406162247 | 6/1994 |
| WO | WO 93/18478 | 9/1993 |

OTHER PUBLICATIONS

Mark Alpert, "Building a Better Bar Code", Jun. 15, 1992 p. 101 Fortune Magazine.

John Burnell & Mark David, "Auto. ID featured at CeBIT", Jun. 1993, vol. 2, No. 4, p. 1, Automatic I.D. News.

Hitachi Ltd., vol. 13, No. 66, p. 828, Oct. 1988.

E.R. Williams, "Two-Dimensional Image Sensor Using One-Dimensional Sensor Array", Jul. 1978, vol. 21, No. 2, pp. 436-437, IBM Technical Disclosure Bulletin.

* cited by examiner

READER FOR DECODING TWO-DIMENSIONAL OPTICALLY READABLE INFORMATION

CROSS REFERENCE TO RELATED APPLICATIONS

The present application is a continuation of U.S. application Ser. No. 09/961,697 filed Sep. 24, 2001, now U.S. Pat. No. 6,641,046, which is a continuation of U.S. application Ser. No. 09/170,689, filed Oct. 13, 1998 now U.S. Pat. No. 6,330,975, which is a continuation of application Ser. No. 08/703,564 filed Aug. 27, 1996, now U.S. Pat. No. 5,821,523, which is a continuation-in-part of application Ser. No. 08/461,605 filed Jun. 5, 1995, now U.S. Pat. No. 5,902,988, which is a continuation of U.S. application Ser. No. 08/277,132, filed Jul. 19, 1994, now abandoned, which is itself a continuation of U.S. application Ser. No. 07/919,488, filed Jul. 27, 1992, now abandoned, which is a continuation-in-part of two applications: (1) U.S. application Ser. No. 07/849,771, filed Mar. 12, 1992, now abandoned; and (2) U.S. application Ser. No. 07/889,705, filed May 26, 1992, now abandoned. The U.S. application Ser. No. 07/889,705 is a continuation-in-part of the application Ser. No. 07/849,771. Application Ser. No. 08/284,883 filed Jul. 28, 1994, now U.S. Pat. No. 5,414,251 is a continuation of the application Ser. No. 07/849,771.

INCORPORATION BY REFERENCE

The previously identified patent applications in the section entitled Cross References to Related Applications which are now U.S. Pat. Nos. 5,821,523 and 5,902,988, are hereby incorporated herein by reference in their entirety.

BACKGROUND OF THE INVENTION

1. Technical Field

The present invention is directed to optical information readers and particularly to readers adapted to selectively decode two-dimensional optical information sets.

2. Description of the Prior Art

Conventional bar code symbols have small data storage capabilities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be keyed for in a database. Since reliance on a database is not required, information may be accessed and exchanged more readily and reliably. However, in order to decode two-dimensional codes, a more sophisticated apparatus is required. This is primarily true since normal vertical code redundancy is not present, making code registration, orientation and condition very important. Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available. For example, two-dimensional codes might consist of a stack of conventional linear codes. Each line may contain different information, such as (1) pricing information, (2) product name, (3) name of the manufacturer, (4) product weight, (5) expiration date, (6) inventory data, (7) shipping information, and the like. Additionally, a user may require the ability to selectively store or send portions of the decoded bar code symbol.

3. Objects of the Invention

Therefore, a principal object of the present invention is to provide a reader adapted to selectively read two-dimensional optical information sets.

Another object of the present invention is to provide a reader adapted to selectively read two-dimensional optical information sets in ambient light.

Another object of the present invention is to provide a reader adapted to selectively read two-dimensional optical information sets from a wide range of distances.

Another object of the present invention is to provide a reader adapted to selectively read optical information while assisting a user in aiming the reader.

Another object of the present invention is to provide a reader adapted to selectively read two-dimensional optical information sets which is economical to manufacture and durable in use.

Another object of the present invention is to provide a reader adapted to selectively read two-dimensional optical information sets which is efficient in operation, simple in construction, easy to use and trouble free. These and other objects will be apparent to those skilled in the art from the following disclosure.

SUMMARY OF THE INVENTION

The present invention discloses a novel reader for reading optical information. In one exemplary embodiment the invention includes a housing for supporting a photosensitive array associated with an optical string means which is adapted to focus optical information on the array. Also provided are array and optical string control means for controlling the array and optical string such that the output of selected images on the array may be processed via pattern recognition means. Images on the array may be presented to the user by a display means. Images recognized to contain decodable optical information may be displayed and highlighted on the display means. In this fashion a user is assisted in aiming, recognizing and confirming the decodability of a coded image incident on the array.

BRIEF DESCRIPTION OF THE DRAWINGS

Other objects and advantages of the invention will be apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
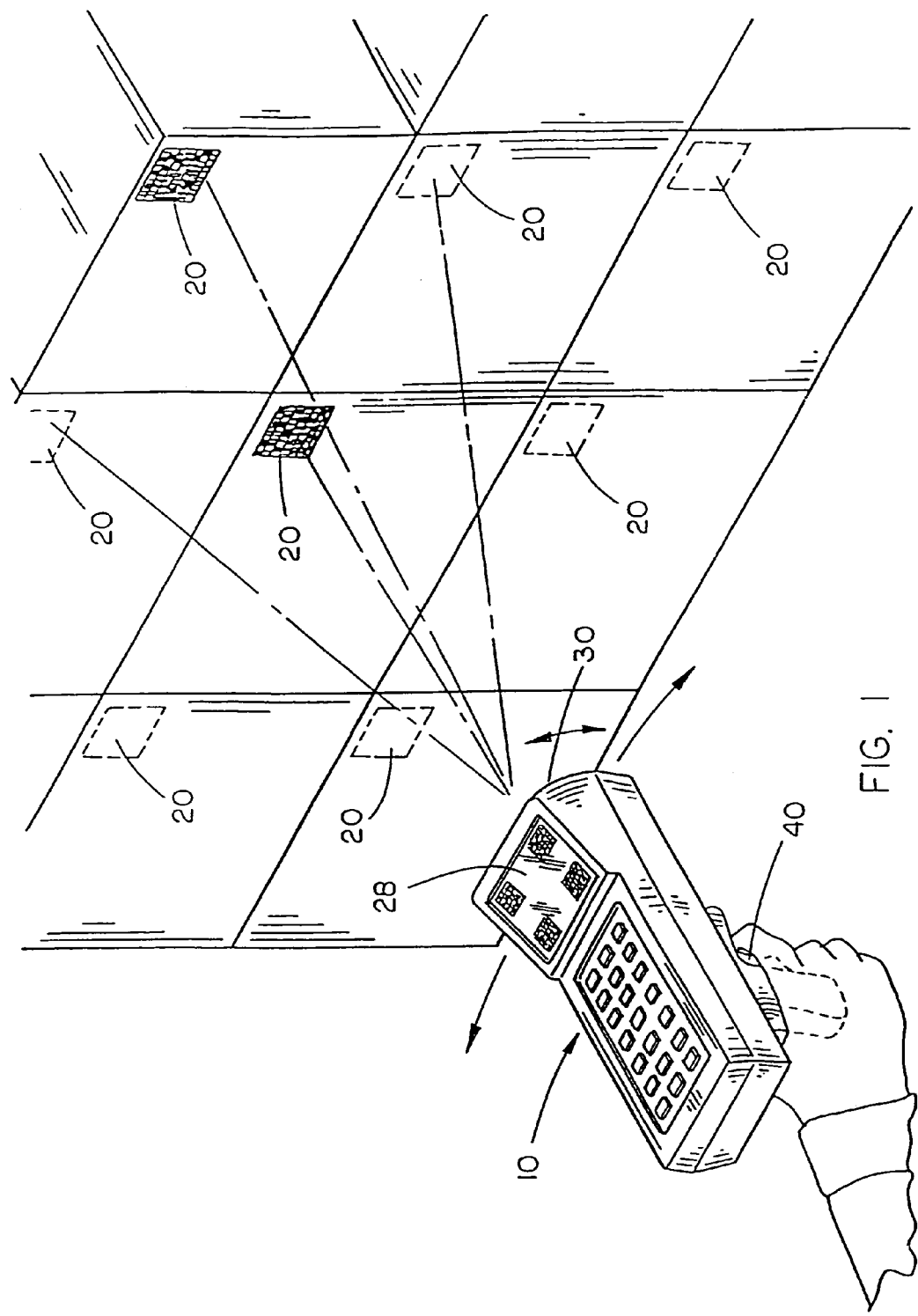
FIG. 1 is a perspective view of a preferred embodiment of the two-dimensional optical information reader showing a user being assisted by the display of the reader in aiming.
Figure 3:
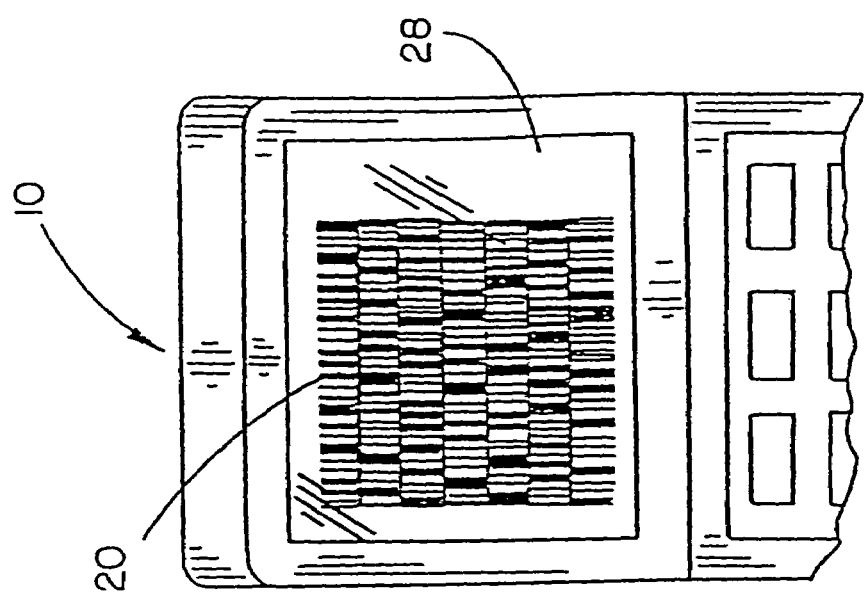
FIG. 3 is a partial top perspective view of the reader illustrating the display wherein the display indicates to a user that a two-dimensional, decodable bar code symbol is centered in view and available for reading.
Figure 2:
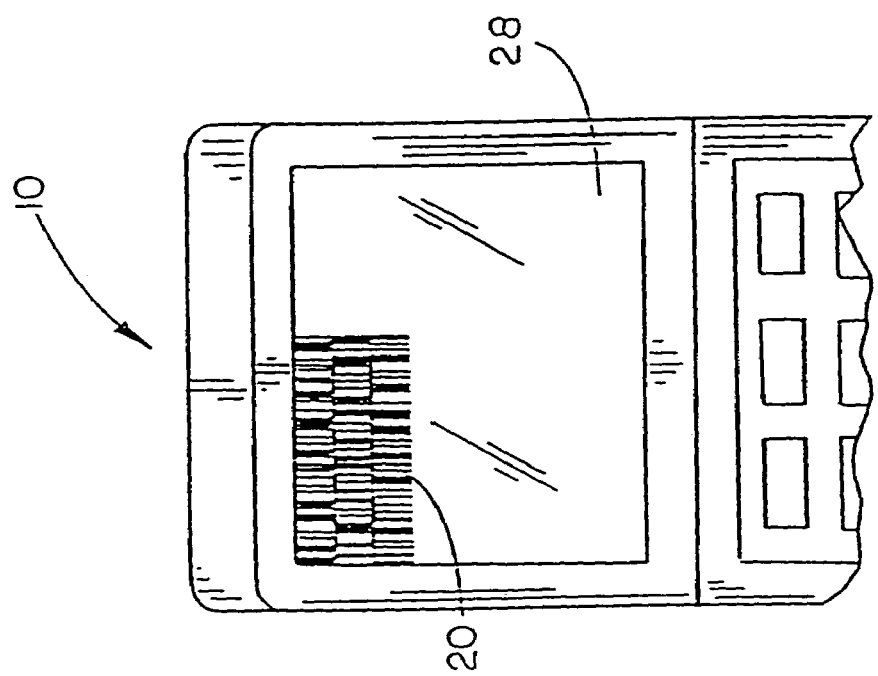
FIG. 2 is a partial top perspective view of the reader illustrating the display wherein the display indicates. to a user that a two-dimensional, decodable, bar code symbol may be read if the user adjusts the aim of the reader to the left and above.
Figure 4:
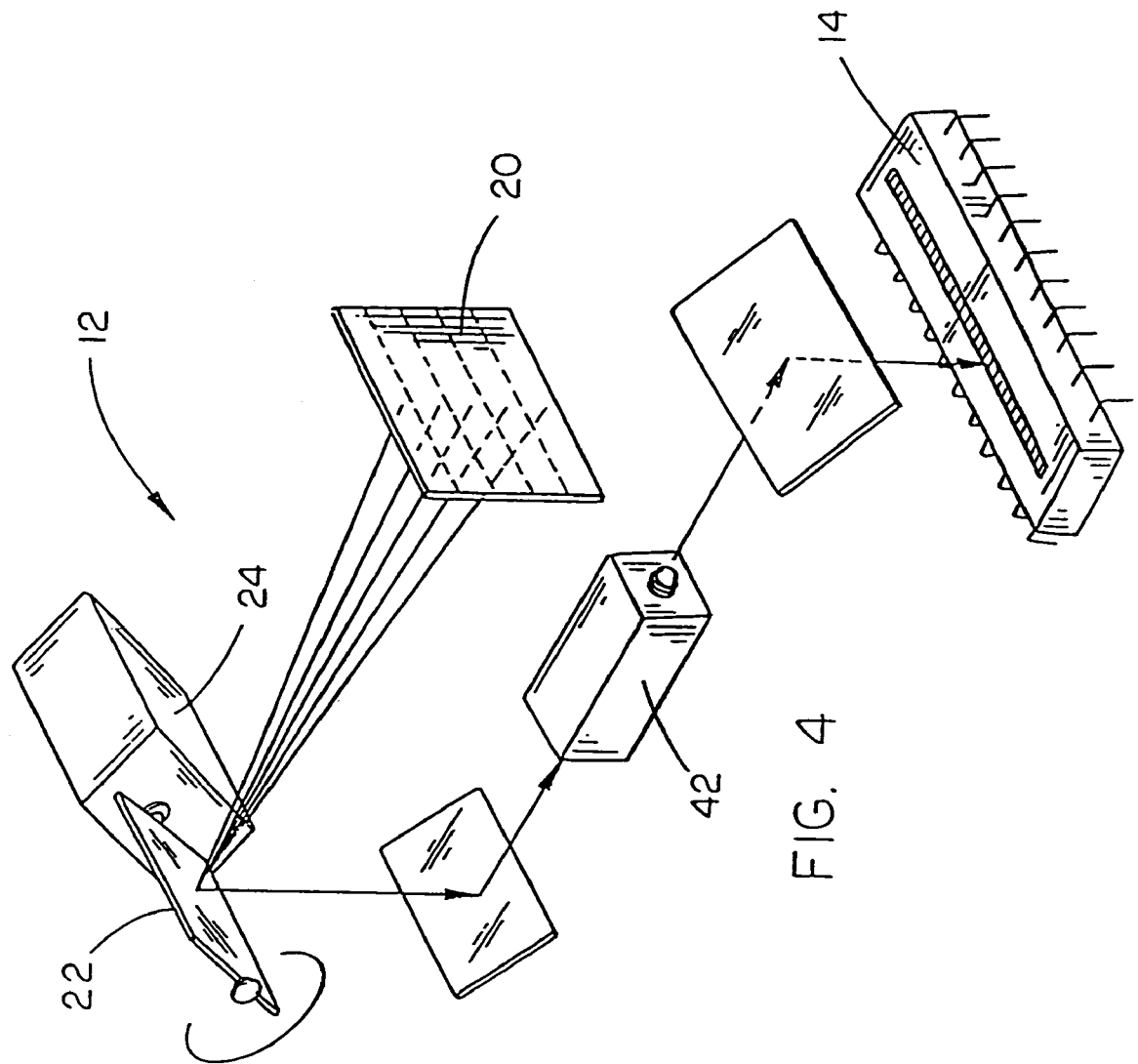
FIG. 4 is a highly diagrammatic perspective view of the image capturing elements of a linear array exemplary embodiment of the present invention.
Figure 5:
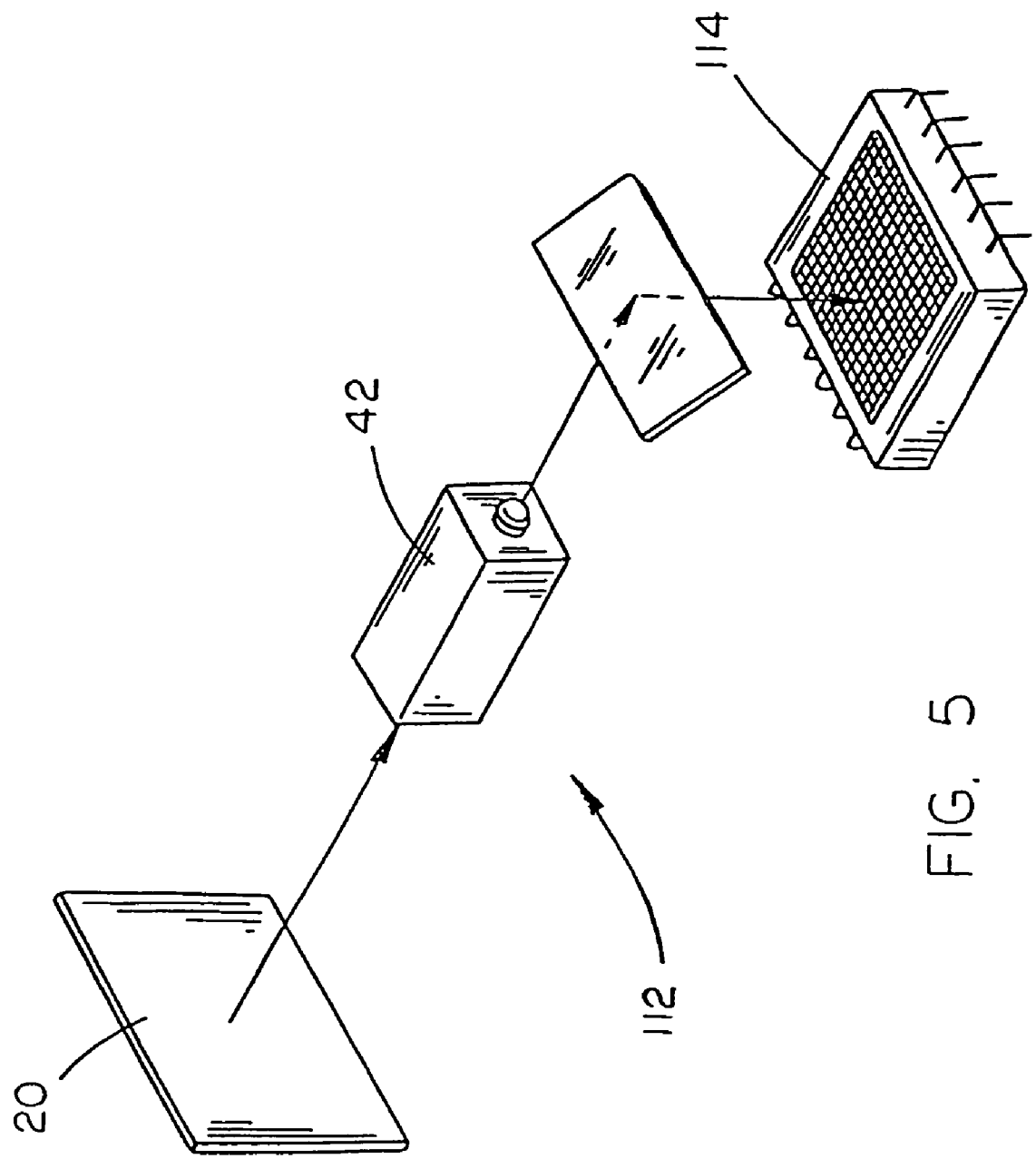
FIG. 5 is a highly diagrammatic perspective view of the image capturing elements of a two-dimensional array exemplary embodiment of the present invention.
Figure 6:
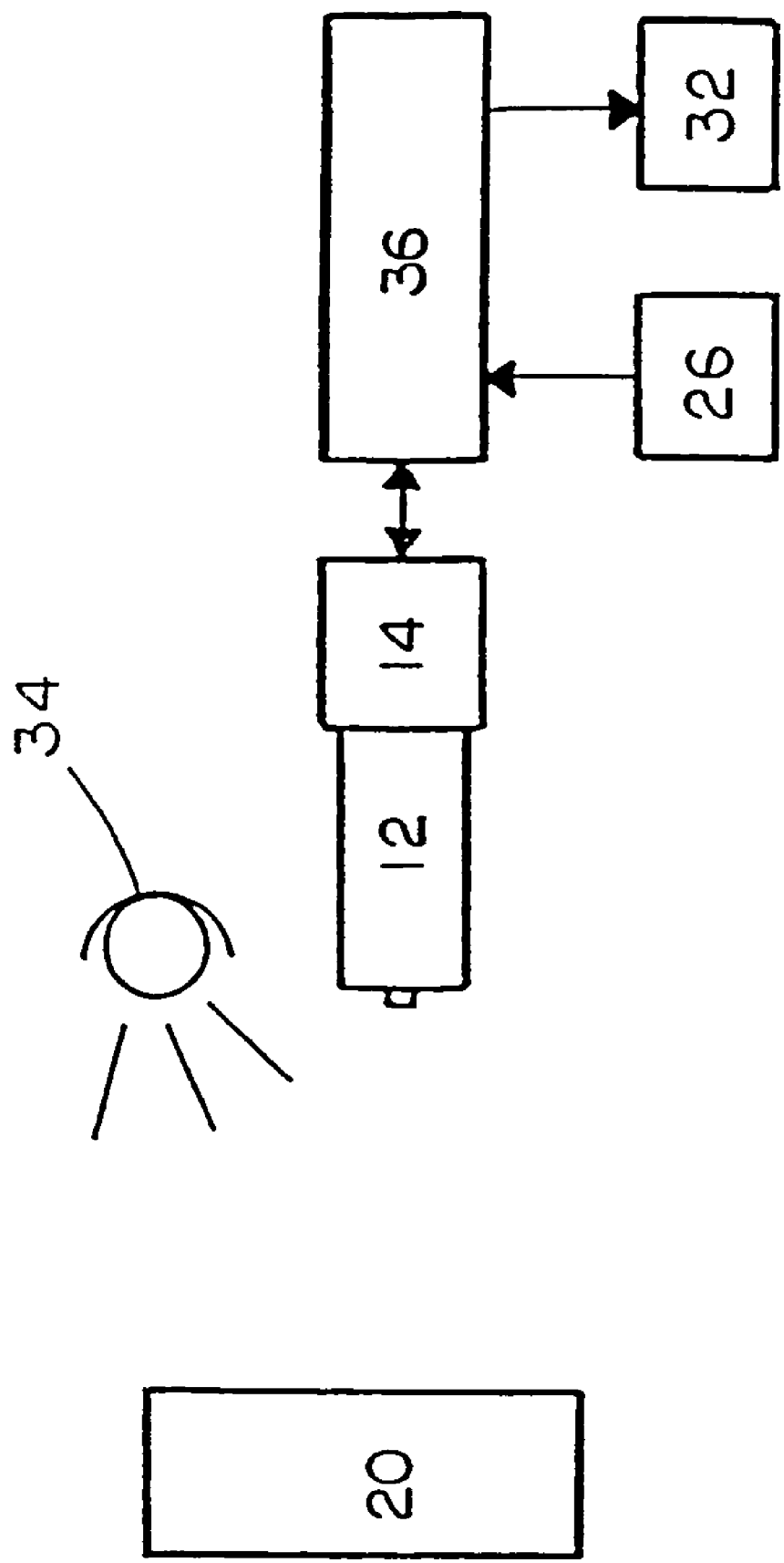
FIG. 6 is a block diagram illustrating the various components of the present invention.
Figure 7:
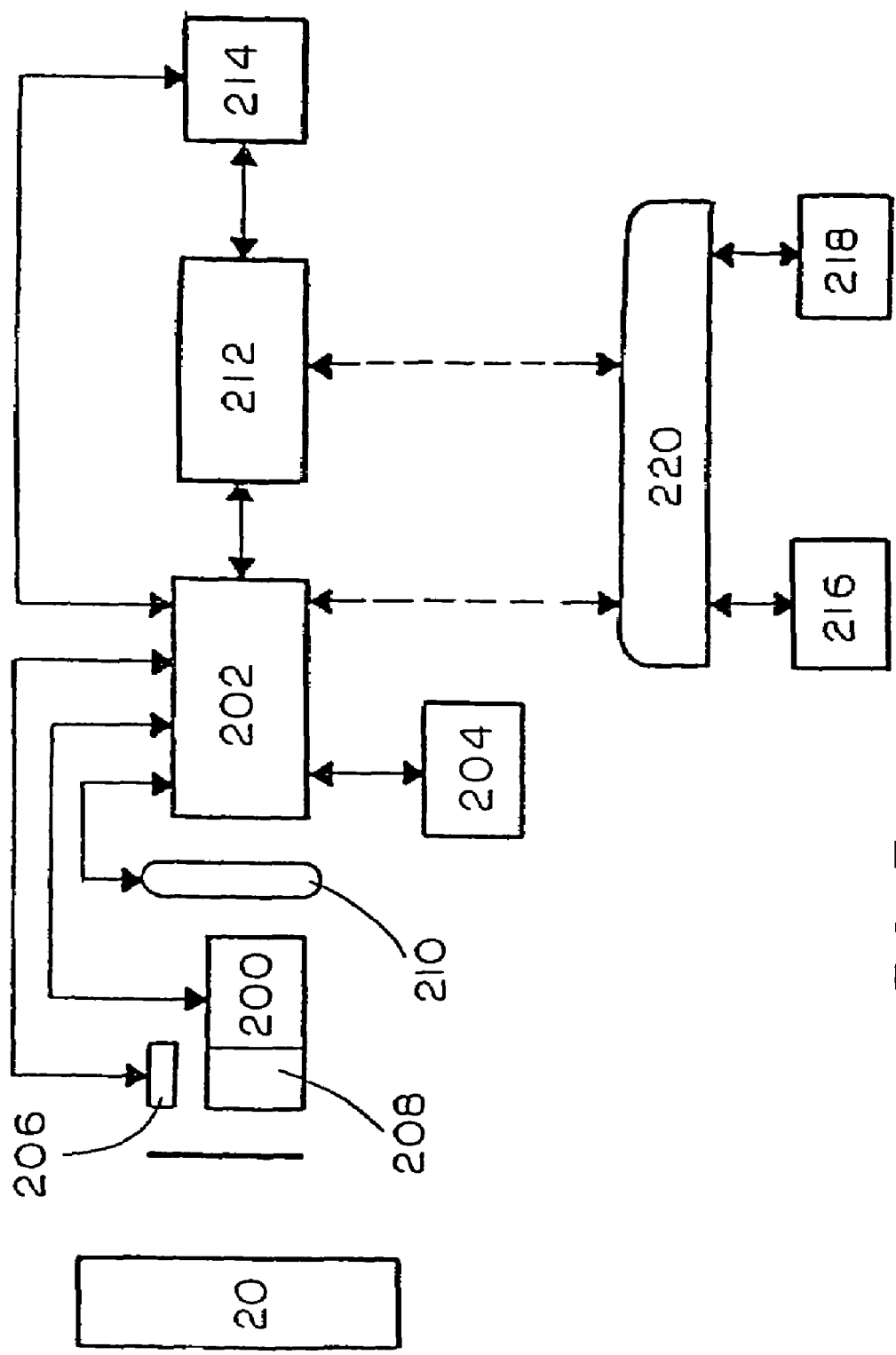
FIG. 7 is a more detailed diagram illustrating the various components of the present invention.

The detailed description of FIGS. 1-7 as found in U.S. Pat. No. 5,902,988 from col. 2, line 63, to col. 7, line 67, is hereby incorporated herein by reference in its entirety.

The detailed description and drawings of U.S. Pat. No. 5,821,523 are also incorporated herein by reference in their entirety as showing in further embodiments within the scope of the present invention.

INCORPORATION BY REFERENCE

The present invention may be construed for use in a docking type system for recharging/communicating with the apparatus disclosed herein. A docking station which might be adapted for use with the present invention is disclosed in U.S. application Ser. No. 07/451,322, filed Dec. 15, 1989, (now U.S. Pat. No. 5,227,614), which application is incorporated herein by reference in its entirety as illustrating arrangements which may be embodied in a peripheral shell 260 (FIG. 10; Ser. No. 07/451,322). Likewise, the disclosure of U.S. Pat. No. 4,877,949, issued Oct. 31, 1989, is also incorporated herein by reference, in its entirety, as illustrating means for focusing an image of optically readable information over a substantial range of distances. Also incorporated herein by reference is U.S. application Ser. No. 07/451,322, filed Dec. 15, 1989, (now U.S. Pat. No. 5,227,614) as illustrating a display 14 (FIGS. 13 and 14) adapted to assist a user of an apparatus in reading optically readable information. Finally, also incorporated in its entirety herein by reference is U.S. application Ser. No. 07/143,921, filed Jan. 14, 1988, as illustrating optically readable information digitizing and decoding means (FIGS. 7 through 18).

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved optical information reader which accomplishes at least all of the stated objects.

What is claimed is:

1. A method for reading two-dimensional optical information, comprising:
   directing a reader at optical information to be read, wherein said reader includes:
   a housing having a light-transmissive portal;
   a photosensitive array, located within said housing to capture two-dimensional optical information;
   an optical system, positioned relative to said photosensitive array and said light-transmissive portal so as to focus two-dimensional optical information onto said photosensitive array;
   a memory system, coupled with said photosensitive array to store output from said photosensitive anay; and
   a display system, coupled with said memory system, to display an image of optical information captured by said photosensitive array;
   displaying an image of captured two-dimensional optical information on said display system; and
   aiming said reader at a specific two-dimensional optical information indicia to be read at least partially with the aid of information displayed on the display system.

2. The method of claim 1, wherein said housing is of a size and shape suited for hand-held operation.

3. The method of claim 1, wherein said photosensitive anay comprises a one-dimensional array.

4. The method of claim 3, wherein said reader further comprises a rastering device configured to raster one-dimensional image segments of two-dimensional optical information onto the photosensitive array.

5. The method of claim 1, wherein said photosensitive anay comprises a two-dimensional array.

6. The method of claim 1, further comprising a zoom system.

7. The method of claim 1, further comprising a focusing system configured to variably focus two-dimensional optical information onto the photosensitive anay.

8. The method of claim 1, wherein the reader further comprises a photosensitive array control system, coupled with said photosensitive anay.

9. The method of claim 1, wherein the reader further comprises a user feedback system to assist reading of two-dimensional optical information.

10. The method of claim 1, wherein the reader further comprises:
    a pattern recognition system configured to assist a user in recognizing two-dimensional optical information; and
    wherein the display system is associated with the housing to display two-dimensional optical information as processed by the pattern recognition system.

11. The method of claim 10, wherein the pattern recognition system comprises a neural network.

12. The method of claim 1, further comprising the step of removing user hand jitter from two-dimensional information displayed to the user.

13. The method of claim 1, wherein the reader further comprises a decoding system configured to decode two-dimensional optical information.

14. The method of claim 13, further comprising the step of decoding captured two-dimensional optical information.

* * * * *